United States Patent [19]
Rigal et al.

[11] Patent Number: 5,900,606
[45] Date of Patent: May 4, 1999

[54] METHOD OF WRITING INFORMATION SECURELY IN A PORTABLE MEDIUM

[75] Inventors: Vincent Rigal, Sceaux; Thierry Koeberle, Montigny-Le-Bretonneux, both of France

[73] Assignee: Schlumberger Industries, S.A., Montrouge, France

[21] Appl. No.: 08/732,507

[22] PCT Filed: Mar. 8, 1996

[86] PCT No.: PCT/FR96/00375

§ 371 Date: Nov. 12, 1996

§ 102(e) Date: Nov. 12, 1996

[87] PCT Pub. No.: WO96/28796

PCT Pub. Date: Sep. 19, 1996

[30] Foreign Application Priority Data

Mar. 10, 1995 [FR] France ................................ 95/02897

[51] Int. Cl.⁶ .......................... G06F 17/00; G06K 5/00; G06K 7/01
[52] U.S. Cl. ................ 235/375; 235/382; 235/382.5
[58] Field of Search ........................ 235/375, 379, 235/380, 382.5, 492; 902/26

[56] References Cited

U.S. PATENT DOCUMENTS

| | | | |
|---|---|---|---|
| 4,727,244 | 2/1988 | Nakano et al. | 235/380 |
| 4,734,569 | 3/1988 | Kawana et al. | 235/487 |
| 4,812,632 | 3/1989 | Kakinuma et al. | 235/479 |
| 5,285,415 | 2/1994 | Depret et al. | 365/189.01 |
| 5,504,701 | 4/1996 | Takahashi et al. | 365/185.04 |
| 5,742,035 | 4/1998 | Kohut | 235/380 |
| 5,763,869 | 6/1998 | Moll et al. | 235/487 |

*Primary Examiner*—Anita Pellman Gross
*Assistant Examiner*—Daniel Sherr
*Attorney, Agent, or Firm*—Frishauf, Holtz, Goodman, Langer & Chick, P.C.

[57] ABSTRACT

A method of writing information securely in a portable information medium fitted with a firmware electronic component. According to the invention, information is written in at least two stages on at least two distinct sites, with information depending on the chosen second site being written in a first step at the first site, and with information necessary for operation of medium being written in a second step at the second site. Application to protecting portable media for electronic transactions against theft.

9 Claims, 1 Drawing Sheet

| COMPONENT MANUFACTURER | MEDIUM MANUFACTURER | OPERATOR |
|---|---|---|
| Component manufacturer code ⇒ | Component manufacturer code ⇒ | Component manufacturer code |
| Z1  Medium manufacturer code ⇒ | Medium manufacturer code ⇒ | Medium manufacturer code |
| | User code | ⇒ User code |
| | Serial number | ⇒ Serial number |
| Transport key 1 ⇒ | Tarnsport key 1 → transport key 2 | ⇒ Transport key 2 → counters |
| Z2 | | Certificate |
| | | Diversified key |

METHOD OF WRITING INFORMATION SECURELY IN A PORTABLE MEDIUM

FIELD OF THE INVENTION

The present invention relates to a method of writing information securely in a portable information medium provided with a firmware electronic component.

A particularly advantage application of the invention lies in the field of securing portable electronic transaction media against theft, in particular during transport between two preparation sites.

BACKGROUND OF THE INVENTION

Numerous electronic transactions systems are known that make use of portable information media The. best known comprise payment systems based on memory cards. Other systems use electronic keys. When appropriately programmed, such portable information media give their holders access to goods or services provided by an operator, such as a pay-phone, electricity, or television.

At present, portable electronic transaction media are manufactured in very large quantities at centralized production sites, and then they are delivered ready for use to an operator or to a distribution center which then passes them on to carriers. Naturally, in the event of theft, said media can be sold beyond the control of the operator.

Various means of providing protection against this risk have been conceived, such as physical protection during transport, which nevertheless turns out to be insufficient since it is expensive, inconvenient, and does not always provide a genuine guarantee.

Identifying stolen media by means of a stop list assumes that reader devices have the capacity to process long lists, and often that is not the case.

Finally, transporting media in small batches does indeed limit the risk, but it makes costs and deadlines unacceptable for large volumes.

Also, for portable information media provided with a firmware electronic component, such as prepaid phone cards, a security technique is known whereby a transport code programmed by the manufacturer of the firmware electronic component makes it possible to ensure that only the manufacturer of media for whom the component is intended will be able to use it.

To extend this service to transport between the manufacturer of the media and the operator-client, it would suffice if the manufacturer did no programming, leaving that to the operator-client. However, such a system would suffer from the major drawback that the transport code could not be given to the operator for reasons of confidentiality unless the media manufacturer were to provide components having different codes as a function of different clients. That solution would lead to very expensive and difficult logistic constraints.

OBJECTS AND SUMMARY OF THE INVENTION

The technical problem to be solved by the present invention is to propose a method of writing information securely in a portable information medium provided with a firmware electronic component, which method makes it possible, in a manner that is very simple and cheap, to obtain a high level of protection against dishonest acts that might occur between manufacture of the media and reception thereof by the operator.

According to the present invention, the solution to the technical problem posed consists in that said information is written in at least two stages on at least two distinct sites, with information depending on the chosen second site being written in a first step at the first site, and with information necessary for operation of said medium being written in a second step at the second site.

The first site may be a centralized media manufacturing site, and the second site may be the operator-client site or a distribution site.

The term "operation of the medium" means that the medium is in a condition to access goods or services.

Thus, it will be understood that if portable media are stolen from the first site, e.g. the site of manufacture, or while in transit to the second site, the site of the operator, then the stolen media cannot be used and are not negotiable since they are impossible to ready for use because the information required for their operation has not been fully written therein.

It can also be added that any possibility of dishonest use is excluded since only the true addressee on the second site of the portable media coming from the first site knows said information that depends on the chosen second site and that makes it possible to write said information necessary for the operation of the received media.

In a preferred implementation of the present invention, said information depending on the chosen second site comprises a transport key specific to the second site and written in said electronic component.

To have access to the component and write the information necessary for operation of the medium therein, the operator on the second site must provide the secret transport key that will have been allocated thereto.

The invention also provides for said information depending on the chosen second site to comprise a code identifying the second site and written in irreversible manner in the component.

The addressee operator on the second site receiving media as delivered by the manufacturer from the first site can thus check that it is indeed the intended media that has been delivered. Also, since the writing is irreversible, even a legitimate operator implementing its own identification code cannot make use of media it might happen to obtain dishonestly or in error.

BRIEF DESCRIPTION OF THE DRAWING

The following description given with reference to the accompanying drawing and by way of non-limiting example makes it easy to understand what the invention consists in and how it can be performed.

MORE DETAILED DESCRIPTION

Figure 1:
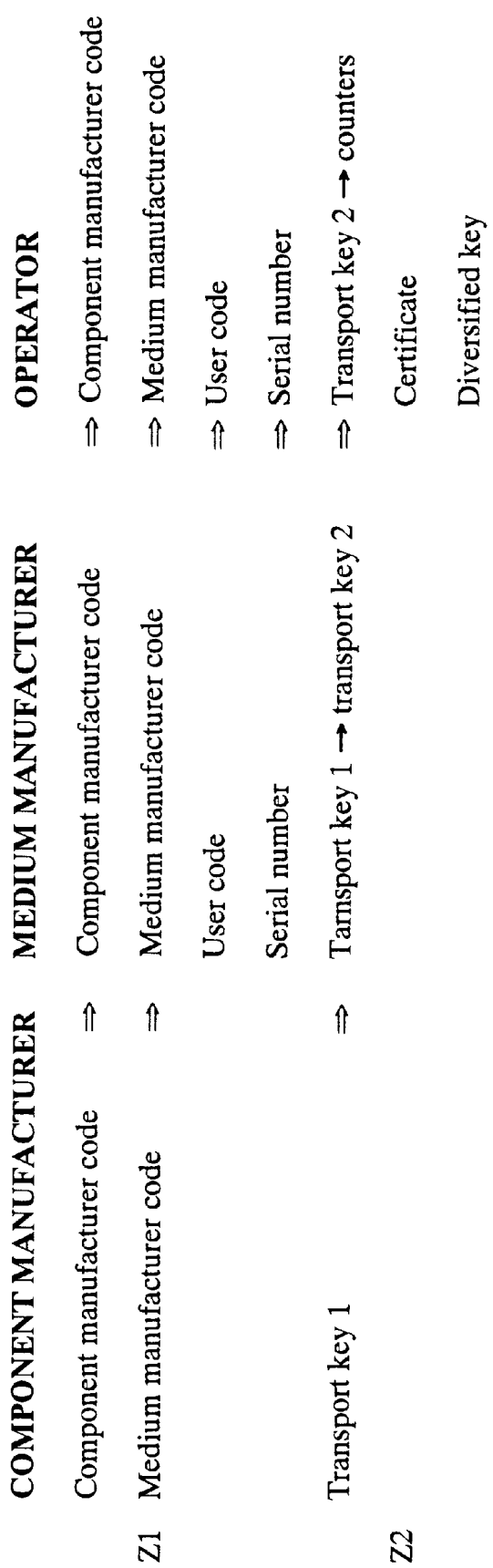
FIG. 1 is a summary table showing the various steps of writing information securely in a portable information medium in application of the method of the invention.

As can be seen in the table of FIG. 1, the process of writing information in a portable medium, such as a memory card, fitted with a firmware electronic component, begins with the manufacturer of the electronic component itself. The manufacturer writes a code in a memory zone Z1 that may be programmed in irreversible manner, which code is characteristic of the component manufacturer, and also a code which is characteristic of the manufacturer of portable media to whom the component is to be delivered. If the electronic component includes a "transport code" function, then the component manufacturer also writes in secret manner a transport key known only to the medium manufacturer.

Information can be written irreversibly in various different ways.

In one implementation, writing is performed in a zone of the component that is subsequently disconnected from the write circuits, e.g. by acting on a fuse.

In another implementation, this information is written in a zone that can be written and read but not erased. Under such circumstances, codes are selected in such a manner that it is necessary to erase at least one bit in order to change code.

On receiving the component, and merely by reading the zone Z1, the manufacturer of portable media can verify the origin of the component and verify that the component has indeed been delivered to the intended addressee.

Thereafter, in order to be able, in turn, to write information in the component the media manufacturer must present the transport key that has been allocated thereto.

Thus, while making the portable medium, the manufacturer can write information that depends on the user, i.e. firstly in the zone Z1 an identification code specific to the operator-user of the support, and secondly a second transport key likewise specific to the user and which, for example, may replace or accompany the first transport key.

Finally, the manufacturer of the portable medium writes in the zone Z1 information that is specific to the portable medium itself, such as an identification number, which number can be printed on the body of the card if said medium is a memory card. This provides additional protection against theft since the numbers of said media can be put on a stop list.

The portable medium is then delivered to the user quite securely. Since it is not in a condition to be used, it is of no financial value. Even if it is stolen, no dishonest information can be written therein since access to the component requires knowledge of the second transport key.

When the user receives the portable medium from the medium manufacturer, the identification code written in the zone Z1 can be read to verify that the medium has indeed been delivered to the intended addressee. Then, after providing the second transport key, the user can write in a zone Z2 of the component such information as is required to enable the medium to operate.

This information comprises at least an identification value, e.g. a certificate or a diversified key computed on the basis of said information specific to the medium plus secret information unknown to the manufacturer of the medium, such as a key for encrypting the serial number of the medium. Preferably, said authentication value is not readable and is used via a conventional "challenge-response" mechanism.

Finally, the user programs counters that define the functional capability of the medium, for example the financial capacity of a prepaid phone card. These counters may be written to replace the second transport key which is no longer of use.

We claim:

1. A method of writing information securely in a portable information medium fitted with a firmware electronic component, wherein said information is written in at least two stages on at least two distinct sites, with information depending on the chosen second site being written in a first step at the first site, and with information necessary for operation of said medium being written in a second step at the second site;

wherein the information necessary for operation of said portable medium comprises counters defining the operational capacity of the medium and written in the electronic component; and wherein said information depending on the chosen second site comprises a transport key specific to the second site and written in said electronic component, and wherein said counters are written during the second step to replace the transport key specific to the second site.

2. A method according to claim 1, wherein said information depending on the chosen second site comprises a transport key specific to the second site and written in said electronic component.

3. A method according to claim 2, wherein said transport key is written during the first step as a replacement for or in addition to a first transport key specific to the first site.

4. A method according to claim 1, wherein said information depending on the choice of second site comprises an identification code of the second site written in irreversible manner in the electronic component.

5. A method according to claim 1, wherein information specific to said portable medium is written in irreversible manner in the electronic component.

6. A method according to claim 5, wherein said serial number is also printed on the programmable medium.

7. A method according to claim 1, wherein information necessary for the operation of said portable medium comprises at least one authentication value relying on secret information unknown to the first site.

8. A method according to claim 7, wherein information specific to said portable medium is written in irreversible manner in the electronic component, and wherein said information necessary for the operation of the portable medium comprises at least one authentication value computed on the basis of said information specific to the medium plus information unknown to the first site.

9. A method according to claim 8, wherein said authentication value is not readable and is used via a "challenge-response" mechanism.

* * * * *

UNITED STATES PATENT AND TRADEMARK OFFICE
CERTIFICATE OF CORRECTION

PATENT NO. : 5,900,606
DATED       : May 4, 1999
INVENTOR(S) : RIGAL et al.

It is certified that error appears in the above-identified patent and that said Letters Patent is hereby corrected as shown below:

On the title page,

Item [56] References Cited, under "U.S. PATENT DOCUMENTS"

```
Delete: "5,285,415  2/1994   Depret et al....365/189.01
         5,742,035  4/1998   Kohut...........235/380
         5,763,869  1/1998   Moll et al......235/487"
Insert: --4,105,156  4/1978   Dethloff........235/487
         4,626,669  12/1986  Davis et al.....235/375
         4,650,975  3/1987   Kitchener.......235/375--.
```

Signed and Sealed this

Tenth Day of April, 2001

*Attest:*

NICHOLAS P. GODICI

*Attesting Officer*  *Acting Director of the United States Patent and Trademark Office*